United States Patent [19]

Holmes et al.

[11] Patent Number: 5,123,730
[45] Date of Patent: Jun. 23, 1992

[54] APPARATUS FOR OPTICAL REMOTE WIND SENSING

[75] Inventors: J. Fred Holmes; Farzin Amzajerdian; John M. Hunt, all of Portland, Oreg.

[73] Assignee: The Oregon Graduate Institute of Science & Technology, Beaverton, Oreg.

[21] Appl. No.: 230,324

[22] Filed: Aug. 9, 1988

[51] Int. Cl.$^5$ .......................... G01P 3/36; G01C 3/08; G01B 9/02
[52] U.S. Cl. ................................. 356/28.5; 356/4.5; 356/5; 356/345; 356/349
[58] Field of Search ................ 356/4.5, 345, 346, 349, 356/351, 5, 28, 28.5

[56] References Cited

U.S. PATENT DOCUMENTS

| 4,447,149 | 5/1984 | Marcus et al. | 356/5 |
| 4,466,738 | 8/1984 | Huang et al. | 356/28.5 X |
| 4,537,502 | 8/1985 | Miller et al. | 356/5 |
| 4,552,456 | 11/1985 | Endo | 256/5 |
| 4,715,706 | 12/1987 | Wang | 356/5 |
| 4,743,110 | 5/1988 | Arnaud et al. | 356/5 |

OTHER PUBLICATIONS

Lee, et al., Statistics of Speckle Propagation Through the Turbulent Atmosphere, Journal of the Optical Society of America, Nov. 1976, vol. 66, No. 11, pp. 1164-1172.
Holmes, et al., Effect of the Log-Amplitude Covariance Function on the Statistics of Speckle Propagation Through the Turbulent Atmosphere, Journal of the Optical Society, vol. 70, No. 4, pp. 335-360.
Wang, et al., Field Tests and Signature Analysis of Imaging $CO_2$ Laser Rader, Proceedings of SPIE, vol. 415, pp. 21-28, 1983.
Holmes, Optical Remote Wind Measurement Using Speckle-Turbulence Interaction, Presented to Optical Society of America, May 27-30, 1986.
Holmes, et al., An Optical System for Remote Wind Sensing Using Speckle-Turbulence Interaction, Submitted to Conference on Lasers and Electro Optics, San Francisco, Calif, Jun. 9-13, 1986.
Holmes, et al., Remote Sensing of Atmospheric Winds Using A Coherent, CW Lidar and Speckle-Turbulence Interaction, Proceedings of 13th Interaction Laser Rader Conference, Toronto, Canada, Aug. 11-15, 1986.
Holmes, et al., Improved Optical Local-Oscillator Isolation Using Multiple Acousto-Optic Modulators and Frequency Diversity, Optics Letters, vol. 12, p. 637, Aug. 1987.
Holmes, et al., Remote Sensing of Atmospheric Winds Using Speckle-Turbulence Interaction, a $CO_2$ Laser, and Optical Heterodyne Detection, Applied Optics, vol. 27, No. 12, Jun. 15, 1988.

Primary Examiner—Stephen C. Buczinski
Assistant Examiner—Linda J. Wallace
Attorney, Agent, or Firm—Kolisch, Hartwell & Dickinson

[57] ABSTRACT

The apparatus of the present invention includes a light source for producing a coherent beam of light. A beam splitter is provided for splitting the beam of light into a first, transmitted beam segment and a second, local oscillator beam. A mechanism is provided for frequency shifting the frequency of one or both beam segments and for directing the first beam segment to a target. A remote target for scattering the first beam is provided. A mechanism is provided for combining the scattered first beam segment returning from the target and the second beam segment into a combined beam, and detecting the combined beam. A detector is operative to generate a signal indicative of the crosswind along the path of the directed first beam segment. A mechanism for determining the wind speed normal to the path from the generated signal is also provided.

16 Claims, 3 Drawing Sheets

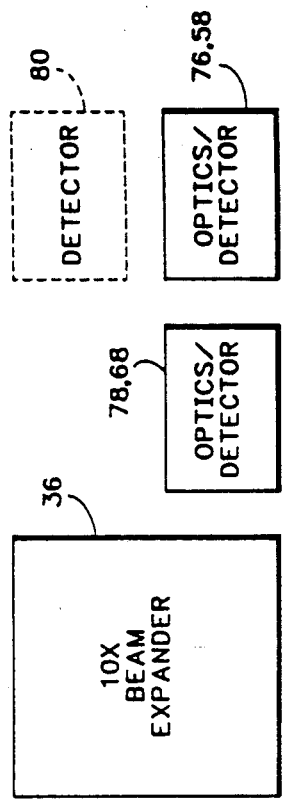
*FIG.2*
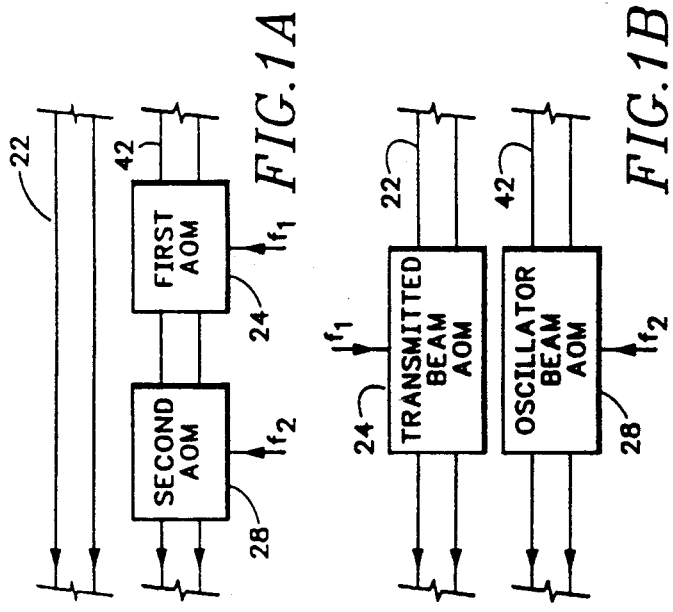
*FIG.1A*
*FIG.1B*
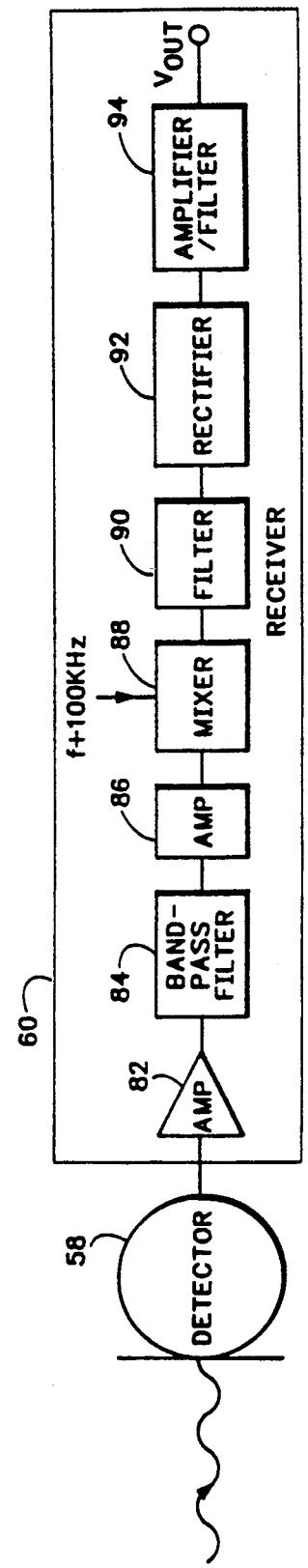
*FIG.3*

APPARATUS FOR OPTICAL REMOTE WIND SENSING

BACKGROUND AND SUMMARY OF THE INVENTION

This invention relates to a coherent beam transmitter-heterodyne receiver system. Specifically, the invention relates to such a system which is useful for measuring atmospheric winds. A method of sensing, optically, a remote wind is described in a co-pending application Ser. No. 07/230,321, filed Aug. 9, 1988, for METHOD FOR PROCESSING WIND INTENSITY DATA.

When a coherent beam transmitter, such as a laser, is used to illuminate a remote target, the resultant, scattered speckle field generated by the target is randomly perturbed by atmospheric turbulence as the speckle field propagates back to the location of the transmitter-receiver. When a crosswind is present, this scintillation pattern will move with time across the receiver aperture, and consequently, the time delayed statistics of the speckle field at the receiver are dependent upon the crosswind velocity. Thus, speckle-turbulence interaction has the potential for enabling single-ended, remote sensing of the path-averaged vector crosswind in a plane perpendicular to the line of sight of a target. This scintillation pattern detection technique makes global remote wind sensing, as from a satellite, possible.

Conventional apparatus for detecting scintillation patterns for remote wind sensing include double-pulsed, visible or near-infrared sources, and direct detection. Such devices include relatively large and expensive transmitters, are susceptible of interference by smoke, dust and fog, and require complex electronic systems to interpret the received signals. Pulsed source transmitters are inherently less stable than continuous wave transmitters and, additionally, suffer beam jitter problems.

A continuous wave laser transmitter of modest power level (one or two watts) used in conjunction with an optical heterodyne detector can be used to exploit the speckle-turbulence interaction and measure atmospheric winds in a ground based system. The use of a continuous wave transmitter operating at a wavelength of 10.6 micrometers and an optical heterodyne detector has many advantages including the availability of compact, reliable and inexpensive transmitters, better penetration of smoke, dust and fog than would a visible laser, stable output power, low beam pointing jitter, and relatively simple receiver electronics. In addition, with the continuous wave transmitter, options exist for processing the received signals for the crosswinds that do not require a knowledge of the strength of turbulence. A pulsed wave, coherent beam system is usable with a diffuse target, such as aerosols.

It should be emphasized that the system to be described does not operate on the same principles as a doppler lidar remote wind sensing system. The doppler systems use the aerosols in the atmosphere to scatter some of the transmitted energy from a coherent pulsed laser system back to a receiver where the doppler shift is used to measure the wind magnitude along the line of sight. The continuous wave speckle-turbulence system uses a hard target, such as the earth, a building or foliage, as the scattering medium and measures the path averaged vector wind in a plane perpendicular to the line of sight. A pulsed wave system may be operated with an aerosol-like target. The approaches compliment each other and each has certain advantages. A significant advantage of the doppler system is that path resolved wind is easily obtained. There are potential methods, such as crossed beams and multiple detectors, for achieving some path resolution with a speckle-turbulence system, however, it would greatly complicate the system. The advantages of a speckle-turbulence system are the ability to measure the vector wind in a plane perpendicular to the line of sight and very simple equipment and data processing. By using optical heterodyne detection, only a watt or two of optical power is needed. Consequently, laser diodes may be used as the transmitter source, enhancing portability and reliability.

An object of the instant invention is to provide an optical heterodyne apparatus for measuring atmospheric winds.

Another object of the invention is to provide an apparatus which uses a low power laser as a continuous wave light source.

Still another object of the invention is providing an apparatus for isolating a local oscillator beam from a transmitted beam by frequency shifting one or both beams in the radio frequency range.

Another object of the invention is to provide an apparatus which uses serially arranged acousto-optic modulators for accomplishing such shifting.

Yet another object of the invention is to provide an apparatus that may be constructed and contained in a relatively compact and low cost transmitter-receiver system.

The apparatus of the present invention includes a light source for producing a coherent beam of light. A beam splitter is provided for splitting the beam of light into a first, transmitted beam segment and a second, local oscillator beam. Means are provided for frequency shifting the frequency of one or both beam segments and for directing the first beam segment to a target. A remote target for scattering the first beam is provided. Means are provided for combining the scattered first beam segment returning from the target and the second beam segment into a combined beam, and detecting the combined beam. A detector is operative to generate a signal indicative of the crosswind along the path of the directed first beam segment. Means for determining the wind speed normal to the path from the generated signal are also provided.

These and other objects and advantages of the invention will become more fully apparent as the detailed description which follows is read in conjunction with the accompanying drawings.

BRIEF DESCRIPTION OF THE DRAWINGS

FIG. 1A depicts a modified form of the invention.

FIG. 1B depicts a second modified form of the invention.

FIG. 2 depicts, somewhat schematically, a front view of a transmitter/receiver of the apparatus.

FIG. 3 is a block diagram depicting the receiver electronics used to process a received signal.

DETAILED DESCRIPTION OF THE PREFERRED EMBODIMENTS

Figure 1:
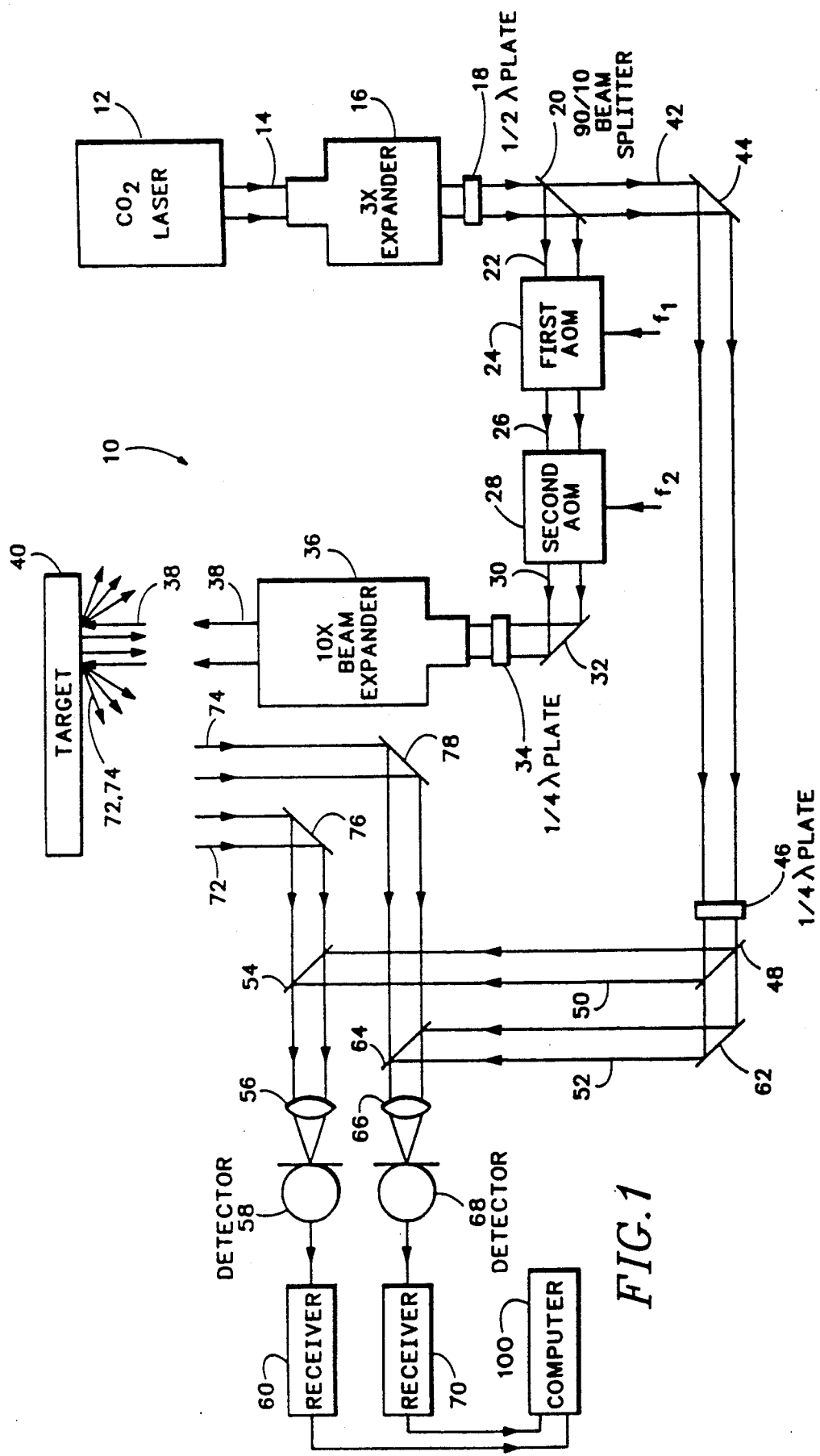
FIG. 1 is a block diagram depicting an apparatus for optical remote wind sensing.

A block diagram of the apparatus of the invention is illustrated in FIG. 1 generally at 10. Apparatus 10 includes, in the preferred embodiment, a $CO_2$ waveguide laser 12 which is operated continuously at a frequency $f_0$. The source beam 14 of laser 12 is expanded by a $3\times$ beam expander 16 and then horizontally polarized by half-wave plate 18. Beam 14 is split into two segments by a 90%/10% beam splitter 20. In this form of the apparatus, the first beam segment 22 having approximately 90% of the power of beam 14 is directed to an acousto-optic modulator (AOM) 24 where beam 14 is radio frequency-shifted at a frequency $f_1$, producing a beam segment 26 which has a frequency $f_0 \pm f_1$, also referred to herein as $f_a$.

Beam 26 is next directed toward a second AOM 28 where it is radio frequency-shifted at a frequency $f_2$, producing a frequency-shifted beam segment 30 having a frequency of $f_0 \pm f_1 \pm f_2$, also referred to herein as $f_b$.

Frequency-shifted first beam segment 30 is then directed by suitable optics 32 to a quarter-wave plate 34 which provides a circularly polarized beam, which is then directed to a 10X beam expander 36. The expanded, frequency-shifted beam 38 is then directed toward a remote target 40.

The second segment 42 having approximately 10% of the power of beam 14 serves as a local oscillator beam which is directed, by suitable optics 44 to a quarter-wave plate 46 where it is circularly polarized to complement the transmitted beam. Polarized beam 42 is then directed toward a beam splitter 48 where it is split into beam components 50, 52, thereby forming plural local oscillator beams. In some configurations of the apparatus, it may be necessary to employ a second beam splitter at this location to split the local oscillator beam 42 into more than two segments.

Local oscillator segment 50 is directed by means of a beam splitter 54 and optics 56 to a detector 58, which is of the HgCdTe photovoltaic type. Detector 58, also referred to herein as a detector element, generates a signal which is transmitted to a receiver 60.

Local oscillator segment 52 is directed by suitable optics 62, beam splitter 64 and optics 66 to a detector element 68, which generates a signal which is passed to receiver 70, which is constructed similarly to receiver 60. In the event that a third detector element is provided, the appropriate local oscillator beam segment would be directed toward it by suitable optics, and it would be connected to a receiver, like receiver 60 and 70. The scattered radiation 72, 74 of transmitted beam 38 is directed to detectors 58, 68 by optics 76, 54, 56 and 78, 64, 66, respectively.

In the embodiment depicted in FIG. 1, the transmitted beam is directed at a remote, diffuse target 40. If it is desired to use aerosols as the target, a pulsed wave, coherent beam source would be used in place of continuous wave beam source 12. In the presence of a crosswind in a plane normal to the transmitted beam, a scintillation pattern appears in the resulting received reflected radiation from the transmitted beam. Wind velocity may be deduced from this scintillation data by a variety of numerical methods described in co-pending application Ser. No. 07/230,321, filed Aug. 9, 1988, METHOD FOR PROCESSING WIND INTENSITY DATA. Scattered radiation 72, 74 is combined with local oscillator beam segments 50, 52 and optically mixed by detectors 58, 68, respectively. The outputs of detectors 58, 68 are monitored by receiver electronics 60, 70.

It should be noted that in order to measure only the magnitude of the wind in a plane perpendicular to the line of sight between beam expander 36 and target 40, only one detector element is required. Wind magnitude is measured by a time-difference detection of the scattered beam by measuring the reflected beam at a detector element at two or more intervals, which are spaced by a known time. However, to measure the direction of the wind, two or more detectors, such as shown in FIGS. 1 and 2, must be used. In the latter case, the apparatus is suitable to measure the component of the wind along the line joining the two detectors. Consideration must, of course, be made of the actual path of the scattered beams caused by optics 56, 66. If detector elements 58, 68 are separated horizontally, the apparatus may then be used to measure the horizontal component of the wind in a plane approximately perpendicular to the direction of the transmitted beam. In order to also measure the vertical component of the wind, a third detector, displaced vertically from detectors 58, 68, must be used, as depicted in FIG. 2, with vertically spaced detector 80. With the configuration including the vertically spaced detector, the vector wind may be determined in a plane approximately orthogonal to the transmitted beam.

FIG. 3 illustrates the receiver apparatus, such as that shown generally at 60, used in conjunction with the optical heterodyne system of FIG. 1 to obtain electrical signals which may be processed to obtain wind data. The heterodyne signal of each detector is a sinusoidal function at the heterodyne frequency which is amplitude and phase modulated by the speckle and atmospheric turbulence. It is the purpose of the receiver electronics to demodulate the heterodyne signal and to recover the amplitude and phase information which contains the wind indicative information. In the preferred embodiment of the invention, the amplitude information is recovered and processed to determine the wind information. The output of detector 58 passes, in turn, through transimpedance amplifier 82, band-pass filter 84, which is tuned to frequency f, the heterodyne frequency, amplifier 86, and mixer 88. Each detected component is mixed individually with a signal of f+100 KHz in mixer 88 to yield a signal at 100 kilohertz. (If f=100 KHz, mixer 88 is not required). The voltage output of mixer 88 is band-pass filtered at 100 KHz by filter 90, precision rectified by rectifier 92 and amplified and low-pass filtered by amplifier/filter 94 to provide a signal proportional to the amplitude of the heterodyne signal. A separate electronic receiver is used for each detector. The signals from each electronic receiver are processed by a computer 100 to determine the vector wind.

Referring now to FIG. 1A, a modified form of the apparatus is depicted wherein AOMs 24, 28 are located in the local oscillator beam segment 42 which results in the transmitted beam having a frequency $f_0$ and a local oscillator beam having a frequency $f_0 \pm f_1 \pm f_2$.

Alternately, as depicted in FIG. 1B, a single AOM may be placed in each of the transmitted beam segment and local oscillator beam segment, such as depicted in the figure, wherein AOM 24 is located in transmitted beam segment 22 and AOM 28 is located in local oscillator beam segment 42.

Referring now to FIG. 1, in operation, the apparatus is energized to produce a beam with laser 12. The transmitted beam, having a frequency $f_0$ is split into two segments, the first of which is frequency-shifted, as by AOM 24, driven at frequency $f_1$ (in the RF range), resulting in a transmitted beam segment that has been frequency-shifted by $f_1$ to produce a beam of frequency $f_0 \pm f_1$. The resultant beam is sequentially frequency-shifted by a second AOM, driven at frequency $f_2$ (also in the RF range), resulting in a beam segment which now has a frequency $f_0 \pm f_1 \pm f_2$.

A local oscillator beam segment of the same source beam is provided and is mixed with the scattered radiation from the first segment of the light beam.

This mixed beam generates a signal at the detector which includes substantially reduced transmitted beam content which has been fed back with the local oscillator beam. In other words, of the signals present at detectors 58, 68, those associated with the transmitted beam, and fed back with the local oscillator beam, namely those at frequencies $f_0 \pm f_1 \pm f_2$ are of such low power, that when mixed with the local oscillator beam, the heterodyne signal produced cannot be detected by conventional means. By modulating the transmitted beam sequentially through two AOMs to shift the frequency thereof and mixing the scattered beam with the local oscillator beam, an intermediate frequency signal may be produced that contains negligible contaminating power components.

Figure 4:
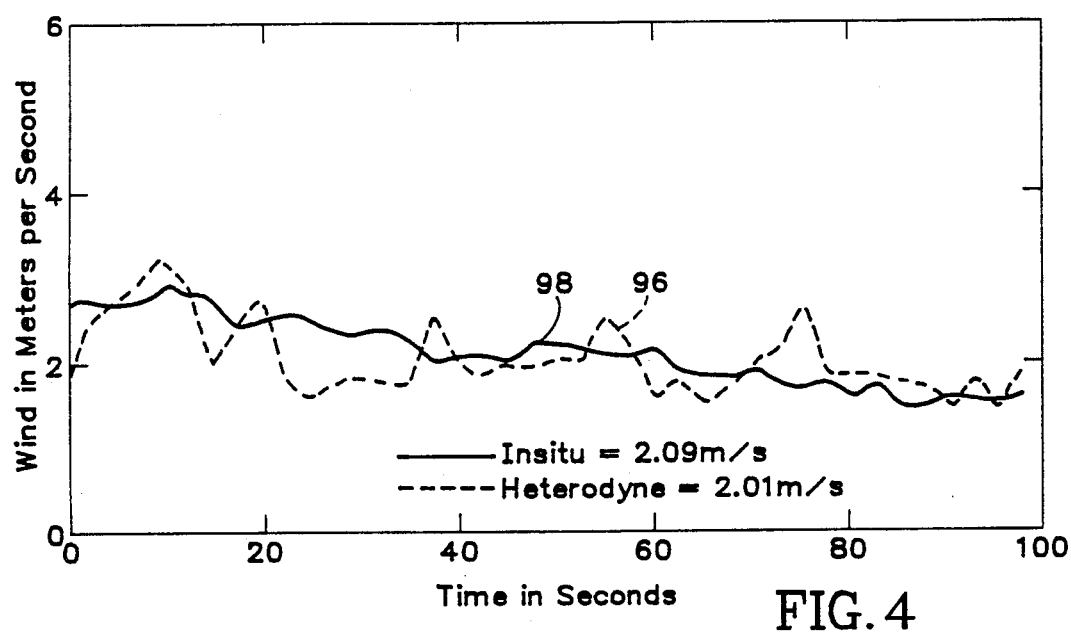
FIG. 4 is a graph depicting experimental wind data derived from the apparatus of the invention.

An example of wind measurement using the speckle-turbulence system in the apparatus of the invention is shown in FIG. 4. In this test, target 40 was located at one kilometer, and the turbulence level was intermediate, at $2.37 \times 10^{-14}$ m$^{-\frac{2}{3}}$. Forty measurements were made over a 100 second interval with 2.5 second averages. The data was processed using a method called the Binary-Z log ratio which is described in co-pending application Ser. No. 07/230,321, filed Aug. 9, 1988. METHOD FOR PROCESSING WIND INTENSITY DATA. There is some fluctuation about the mean due to the speckle, but the RMS error is determined to be 0.33 m/s. A mean wind speed value 96 of 2.01 m/s, averaged over the forty measurements compares well with the in situ measurement 98 of 2.09 m/s, as determined by a Campbell Scientific CA-9 Path Averaging Scintillometer and Crosswind Sensor. The Campbell unit is a double ended unit with a transmitter at one end and a receiver at the other and has a cosine-like wind sensitivity function. Experimental work has demonstrated that the apparatus of the invention is operable at turbulence levels as low as $7.4 \times 10^{-16}$ m$^{-\frac{2}{3}}$.

Accordingly, while a preferred embodiment of the invention has been described herein, it should be appreciated that further modifications may be made within the scope of the invention.

It is claimed and desired to secure by Letters Patent:

1. Apparatus for optical remote wind sensing of a crosswind along a line-of-sight path comprising:
   a light source for producing a coherent beam of light having a frequency $f_0$;
   a beam splitter for splitting the beam of light into a first beam segment having a frequency of $f_0$ and a second beam segment having a frequency $f_0$;
   frequency shifting means, including a pair of serially arranged acousto-optical modulators, located in said first beam segment for shifting the frequency of the segment to a resultant frequency $f_b$;
   means for directing the first beam segment to a target;
   a remote target for scattering the first beam segment resulting in a reflected, scattered beam;
   means for combining the scattered beam and said second beam segment into a combined beam;
   detector means for detecting said combined beam and for generating a signal indicative of the crosswind along the path of the directed first beam segment; and
   means for determining the wind speed normal to the path from said signal.

2. The apparatus of claim 1 wherein said acousto-optic modulators operate in radio frequency ranges.

3. The apparatus of claim 1 wherein said detector means includes multiple, spaced-apart detector elements providing time difference detection of the scattered beam.

4. Apparatus for optical remote wind sensing of a crosswind along a line-of-sight path comprising:
   a light source for producing a coherent beam of light having a frequency $f_0$;
   a beam splitter for splitting the beam of light into a first, transmitted, beam segment having a frequency of $f_0$ and a second, local oscillator, beam segment having a frequency $f_0$;
   a first frequency shifter for shifting the frequency of the first beam segment to a first resultant frequency $f_a$;
   a second frequency shifter arranged in series with said first frequency shifter for shifting the frequency of the first beam segment to a second resultant frequency $f_b$;
   means for directing the first beam segment having frequency $f_b$ to a target;
   a remote target for scattering the first beam segment;
   means for combining the scattered first beam segment having frequency $f_b$ and said second beam segment having frequency $f_0$ into a combined beam;
   detector means for detecting said combined beam and for generating a signal indicative of the crosswind along the path of the directed first beam segment; and
   means for determining the wind speed normal to the path from said signal.

5. The apparatus of claim 4 wherein said frequency shifters are of the acousto-optic modulator type.

6. The apparatus of claim 5 wherein said acousto-optic modulators operate in the radio frequency range.

7. The apparatus of claim 4 wherein said detector means includes multiple, spaced-apart detector elements providing time difference detection of the scattered beam.

8. Apparatus for optical remote wind sensing of a crosswind along a line-of-sight path comprising:
   a first measuring system including:
   a light source for producing a coherent beam of light having a frequency $f_0$;
   a beam splitter for splitting the beam of light into a first, transmitted, beam segment having a frequency $f_0$ and a second, local oscillator, beam segment having a frequency $f_0$;
   a first frequency shifter for shifting the frequency of the second beam segment to a first resultant frequency $f_a$;
   a second frequency shifter arranged in series with said first frequency shifter for shifting the frequency of the second beam segment to a second resultant frequency $f_b$;

means for directing the first beam segment having frequency $f_0$ to a target;

a remote target for scattering the first beam segment;

means for combining the scattered first beam segment having frequency $f_0$ and said second beam segment having frequency $f_b$ into a combined beam;

plural detector means for detecting said combined beam and for generating a signal indicative of the crosswind along the path of the directed first beam segment for the first system; and means for determining the wind speed and direction relative to the apparatus.

9. The apparatus of claim 8 wherein said frequency shifters are of the acousto-optic modulator type.

10. The apparatus of claim 9 wherein said acousto-optic modulators operate in the radio frequency range.

11. The apparatus of claim 8 wherein said detector means includes multiple, spaced-apart detector elements providing time difference detection of the scattered beam.

12. Apparatus for optical remote wind sensing of a crosswind along a line-of-sight path comprising:

a light source for producing a coherent beam of light having a frequency $f_0$;

a first beam expander for increasing by a first known amount the diameter of the beam of light;

a horizontally polarizing half-wave plate for polarizing the beam of light;

a first beam splitter for splitting the beam of light into a first, transmitted, beam segment having a frequency $f_0$ and about 90% of the light beam energy and a second, local oscillator, beam segment having a frequency $f_0$ and about 10% of the light beam energy;

a first frequency shifter for shifting the frequency of the first beam segment to a first resultant frequency $f_a$;

a second frequency shifter arranged in series with said first frequency shifter for shifting the frequency of the first beam segment to a second resultant frequency $f_b$;

a first circularly polarizing quarter-wave plate for polarizing said first beam segment;

a second beam expander for expanding the diameter of the first beam segment by a second known amount and including means for directing the first beam segment having frequency $f_b$ to a target;

a remote target for reflecting the first beam segment to produce a speckle field energy pattern;

a second circularly polarizing quarter-wave plate for circularly polarizing said second beam segment;

second beam splitter means for splitting said second beam segment into plural local oscillator beam segments of substantially equal power;

plural detector means for combining the reflected first beam segment having frequency $f_b$ and one of said local oscillator beam segments having frequency $f_0$ into a combined beam and for detecting said combined beam and for generating a signal indicative of the crosswind along the path of the directed first beam segment; and means for determining a vector wind normal to the path from the signals generated by said detector means.

13. Apparatus for optical remote wind sensing of a crosswind along a line-of-sight path comprising:

a light source for producing a coherent beam of light having a frequency $f_0$;

a beam splitter for splitting the beam of light into a first beam segment having a frequency of $f_0$ and a second beam segment having a frequency $f_0$;

frequency shifting means, including a pair of serially arranged acousto-optical modulators, located in said second beam segment for shifting the frequency of the segment to a resultant frequency $f_b$;

means for directing the first beam segment to a target;

a remote target for scattering the first beam segment resulting in a reflected, scattered beam;

means for combining the scattered beam and said second beam segment into a combined beam;

detector means for detecting said combined beam and for generating a signal indicative of the crosswind along the path of the directed first beam segment; and means for determining the wind speed normal to the path from said signal.

14. The apparatus of claim 13 wherein said acousto-optical modulators operate in radio frequency ranges.

15. The apparatus of claim 13 wherein said detector means includes a multiple, spaced-apart detector elements providing time difference detection of the scattered beam.

16. The apparatus of claim 13 wherein said beam splitter is constructed and arranged to split said beam of light into a first beam segment having about 90% of the light beam energy and into a second beam having about 10% of the light beam energy.

* * * * *